(12) United States Patent
Hamilton (10) Patent No.: US 10,104,049 B2
(45) Date of Patent: Oct. 16, 2018

(54) SECURE DISTRIBUTED PUBLISH/SUBSCRIBE SYSTEM

(71) Applicant: VMware, Inc., Palo Alto, CA (US)

(72) Inventor: Keith Hamilton, Bellevue, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/485,483

(22) Filed: Sep. 12, 2014

(65) Prior Publication Data

US 2016/0080334 A1 Mar. 17, 2016

(51) Int. Cl.
*H04L 29/06* (2006.01)
*G06F 9/54* (2006.01)
*H04L 29/08* (2006.01)

(52) U.S. Cl.
CPC .......... *H04L 63/0457* (2013.01); *G06F 9/542* (2013.01); *H04L 63/0428* (2013.01); *H04L 67/26* (2013.01)

(58) Field of Classification Search
CPC ..... H04L 63/0457; H04L 67/10; H04L 67/24; G06F 9/542
USPC .......................................................... 713/168
See application file for complete search history.

(56) References Cited

U.S. PATENT DOCUMENTS

| 6,055,314 | A  | * | 4/2000 | Spies | G06Q 20/123 348/E7.056 |
| 6,678,733 | B1 | * | 1/2004 | Brown | H04L 63/0209 709/203 |
| 6,772,340 | B1 | * | 8/2004 | Peinado | G06F 21/10 380/201 |
| 7,761,465 | B1 | * | 7/2010 | Nonaka | G06F 21/10 707/770 |
| 8,402,081 | B2 | * | 3/2013 | Sandoval | G06F 17/30569 709/201 |
| 2002/0051539 | A1 | * | 5/2002 | Okimoto | H04N 7/165 380/211 |
| 2004/0151310 | A1 | * | 8/2004 | Fu | G06F 21/6209 380/44 |
| 2006/0206945 | A1 | * | 9/2006 | Kato | H04L 9/083 726/27 |
| 2008/0006683 | A1 | * | 1/2008 | Abe | G06Q 10/06 235/375 |
| 2008/0013724 | A1 | * | 1/2008 | Shamoon | H04L 63/0428 380/201 |
| 2008/0307436 | A1 |   | 12/2008 | Hamilton | |
| 2009/0136028 | A1 | * | 5/2009 | Card, II | H04N 7/162 380/200 |
| 2009/0180617 | A1 | * | 7/2009 | Peterka | H04L 9/083 380/277 |
| 2012/0284802 | A1 | * | 11/2012 | Hierro | G06F 21/10 726/27 |

(Continued)

*Primary Examiner* — Harunur Rashid
*Assistant Examiner* — Sakinah W Taylor
(74) *Attorney, Agent, or Firm* — Patterson & Sheridan, LLP (57) ABSTRACT

A distributed event system includes a plurality of publishers, a communication infrastructure, and a key manager that manages access to publishing of events by one or more applications. An event is published, by a publisher, when the publisher determines an occurrence of an event and, in response, obtains a key from the key manager. The publisher then encrypts the event with the key to produce an encrypted event and transmits the encrypted event for consumption by a subscriber to the event.

17 Claims, 6 Drawing Sheets

(56) References Cited

U.S. PATENT DOCUMENTS

2013/0061035 A1* 3/2013 Hook .................. H04L 9/088
   713/150
2013/0073719 A1* 3/2013 Ando .................. G06F 9/542
   709/224

* cited by examiner

SECURE DISTRIBUTED PUBLISH/SUBSCRIBE SYSTEM

BACKGROUND

Publish/subscribe systems offer a useful pattern to communicate events among entities connected over a network, or among processes executing in a single computer. One advantage is that a publisher of information need not maintain a list of recipients for that information. Instead, the publisher simply transmits the information to the publish/subscribe system, which maintains a list of subscribers to which the information is to be transmitted. Further, the publish/subscribe system allows publishers and subscribers to easily reverse roles. That is, a publisher may publish certain information for a set of subscribers, while each of the subscribers may publish information in response. If the original publisher itself subscribes to these responses, then an effective request/response infrastructure is achieved.

A drawback of publish/subscribe systems is that they lack privacy and authentication mechanisms. Due to the lack of privacy, sensitive data that is published to members of a group may be obtained by use of packet analyzers or network sniffing devices. Further, because authentication is usably lacking in publish/subscribe systems, it is difficult to support certain types of remote management functions using this pattern. For example, without effective authentication, it would be difficult, if not impossible, to determine with certainty whether a publisher who sends a command to a subscribing system for execution on that subscribing system is indeed authorized to instruct the subscribing system to perform the function.

SUMMARY

In one embodiment, a method of publishing an event for consumption by a subscriber to the event is provided, the method being performed in a distributed event system that includes a plurality of publishers, a communication infrastructure, and a key manager that manages access to publishing of events by one or more applications. The method comprises the steps of determining an occurrence of an event, and, responsive to the determining, obtaining a key from the key manager. The method further comprises the steps of encrypting the event with the key to produce an encrypted event, and transmitting the encrypted event for consumption by the subscriber.

In a second embodiment, a method of subscribing to an event is provided, the method being performed in a distributed event system that includes a plurality of subscribers, a communication infrastructure, and a key manager that manages access to subscribing to events by one or more applications. The method comprises the steps of determining that the event has been published and obtaining a key from the key manager. The method further includes the steps of decrypting the event with the key to produce an unencrypted event, and consuming the unencrypted event.

In a third embodiment, a computer-based system includes a processor, memory, and a communication infrastructure. The system is programmed with a first set of instructions for the system to perform the steps of a publisher, and a second set of instructions for the system to perform the steps of a subscriber. When the first and second set of instructions are executed, the system performs a method comprising the steps of determining an occurrence of an event and, responsive to the determining, obtaining, a first key from a key management server. The method further includes the steps of encrypting the event with the first key to produce an encrypted event and transmitting the encrypted event for consumption by the subscriber.

DETAILED DESCRIPTION

Figure 1:
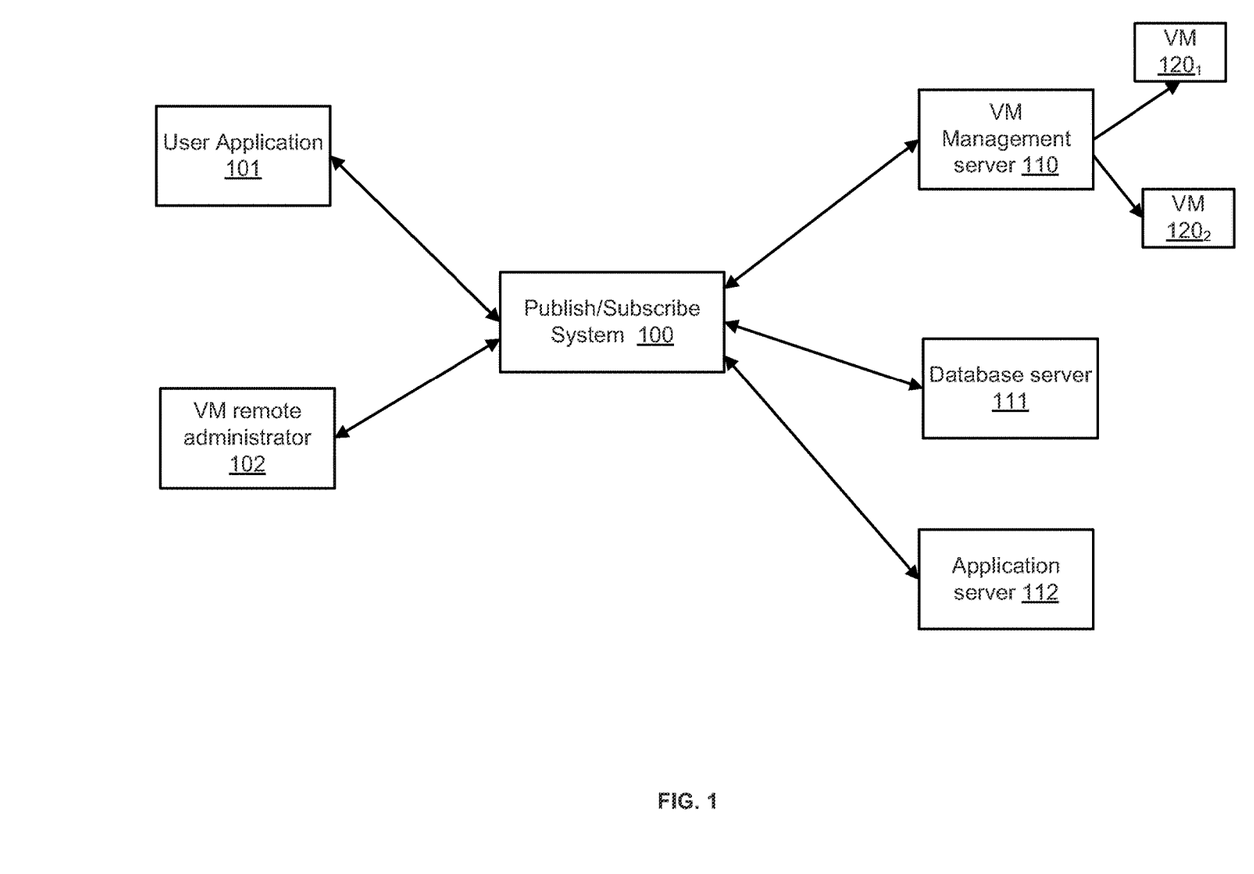
FIG. 1 is a conceptual diagram that depicts a computing environment in which one or more embodiments may be implemented.

FIG. 1 is a conceptual diagram that depicts a computing environment in which one or more embodiments may be implemented. As shown, the computing environment includes, at center, a publish/subscribe system 100. Publish/subscribe system 100 implements a messaging paradigm, where senders, referred to as publishers, do not directly send messages to specific receivers. Rather, the messages are published by publishing applications (such as user application 101 or VM remote administrator 102, depicted in FIG. 1), where the messages (referred to herein as "events") are classified as being of a certain type (or, as referred to herein, as an "event type"). Receiving applications, referred to as subscribers, communicate with publish/subscribe system 100 in order to specify one or more event types that the particular receiving application is interested in. A publisher may not be aware of whether, or how many, subscribers have specified an interest in the event types that the publisher publishes. Similarly, a subscriber may not be aware of whether, or how many, publishing applications are publishing events in which the subscriber has specified an interest in. It should be noted that entities that interact with publish/subscribe system 100 are able to, at different times, assume the role of publisher or subscriber. One example of publish/subscribe system 100 is disclosed in Hamilton (United States Patent Publication No. 20080307436), entitled "Distributed publish-subscribe event system with routing of published events according to routing tables updated during a subscription process."

In the example depicted in FIG. 1, user application 101 may publish a request event, which is transmitted to publish/subscribe system 100, and then disseminated, by publish/subscribe system 100, to one or more subscribing entities. Each subscribing entity then receives notification of the event. For example, database server 111 and application server 112 may be subscribers to the event type corresponding to the request event published by user application 101. In response to receiving notification of the request event, database server 111 and application server 112 may each respond by executing one or more functions.

In addition, both database server 111 and application server 112 may assume the role of publisher, and publish a response event to user application 101. User application 101 then assumes the role of subscriber, subscribing to the event type that matches that of the response event published by database server 111 and application server 112. For instance, in response to the request event published by user application 101, database server 111 may run a query and publish a first response event, which contains query results. Further, application server may, in response to the request event published by user application 101, execute a program that returns data stored on a storage device connected to application server 112. Application server 112 then publishes a second response event, which contains the returned data. In this way, user application 101 is able to utilize publish/subscribe system 100 to obtain data from multiple data sources.

Another example of the use of publish/subscribe systems (such as publish/subscribe system 100) is as a messaging hub used by virtualized computing environments. For example, as shown in FIG. 1, VM remote administrator 102 interacts with publish/subscribe system 100. VM remote administrator 102 may be a desktop or laptop computer configured to issue commands to a management server (such as VM management server 110). The issued commands, when executed by VM management server 110, perform management functions for virtual machines, such as VMs $120_1$ and $120_2$. In order for a remote administrator to access VM management server 110, VM remote administrator may publish a VM management event (i.e., the event type is "VM management"), where VM management server 110 is a subscriber (and is thus "listening") for such events. The specific VM management command may be included as part of the published event.

For example, a remote administrator may wish to power off VM $120_1$. In this case, the remote administrator accesses VM remote administrator 102 and publishes a VM management event, where data included with the event specifies the power off command, as well as an identifier for VM $120_1$. Publish/subscribe system 100 receives the publication notification from VM remote administrator and publishes the event to all subscribers of that event type (i.e., all subscribers to VM management events). Assuming that VM management server 110 subscribes to VM management events, VM management server 110 is notified of the publication of the event and receives the published data. VM management server 110 then determines that VM remote administrator 102 published a power off command for VM $120_1$. Having made this determination, VM management server 110 then proceeds to power off VM $120_1$, while leaving VM $120_2$ in a powered on state.

It should be noted that, in a publish/subscribe system that lacks a security and authentication mechanism, some publish/subscribe operations may be used in a way to compromise the stability of a system. For example, in the case of virtual machine management just discussed, VM management server 110 receives a power off command by subscribing to VM management events. However, when VM management server 110 receives a published event, the server is not assured that the publisher of the event is authorized to request a powering off of a virtual machine. Thus, without an authentication mechanism, any user may publish a VM management event to VM management server 110, which may result in VM management server 110 executing a command included in the publication.

Further, even if authentication is present in the system, it may be the case that some authenticated users possess secret information (e.g., certain virtual machine identifiers) that other authenticated users lack. Thus, an authenticated user who possesses the secret information would be authorized to use that information in the publish/subscribe system, while an authenticated user who does not possess the secret information would not be so authorized. However, if an authenticated user that is not authorized should intercept a publication (e.g., by installing a packet analyzer or network sniffing device), then that unauthorized user would be able to obtain the secret information included with the publication. However, if this secret information were to be secured in the transmission of the publication (e.g., via encryption), then the unauthorized user would not be able to obtain such information.

Figure 2:
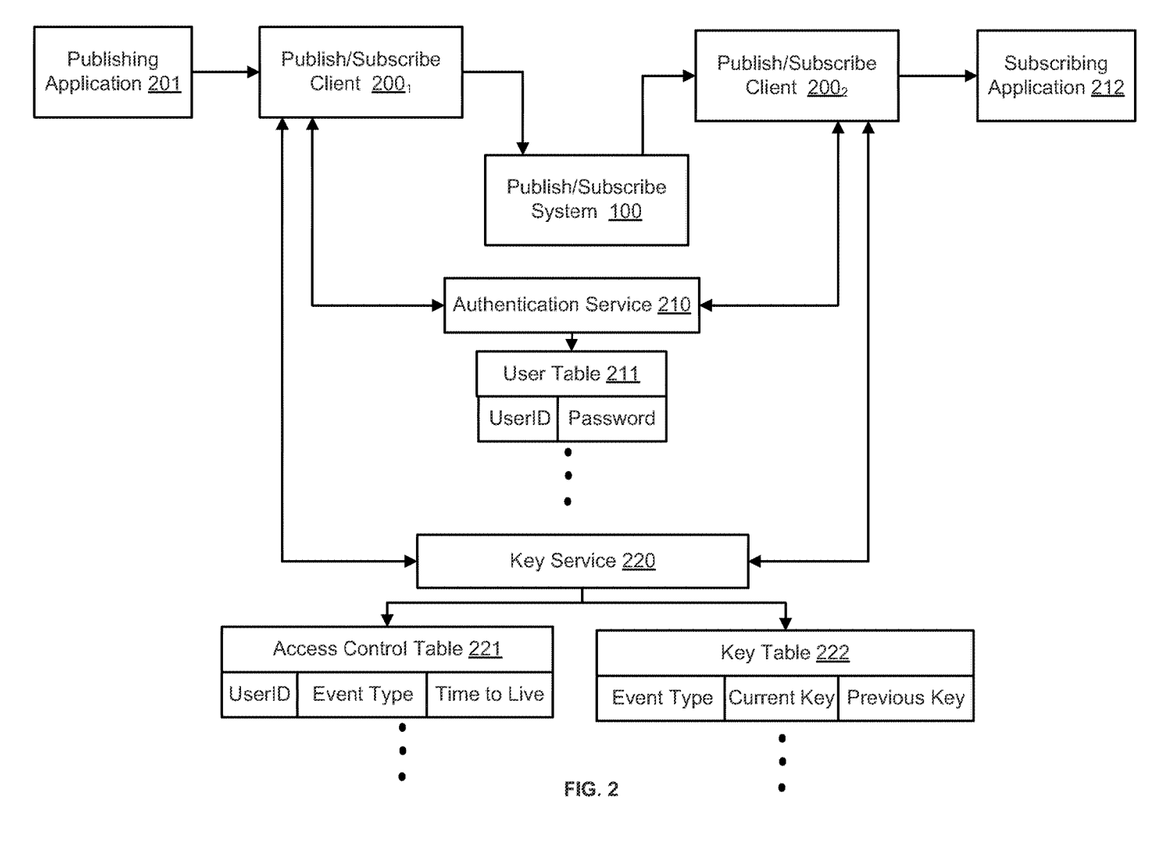
FIG. 2 is a conceptual diagram that depicts a publish/subscribe system that includes privacy and authentication, according to one or more embodiments.

FIG. 2 is a conceptual diagram that depicts a publish/subscribe system that includes privacy, authentication, and authorization, according to one or more embodiments. As shown, publish/subscribe system 100 is at the center and, as in FIG. 1, implements the infrastructure to support the publishing and routing of events to subscribers of those events. As shown, publishing application 201 has data or commands that are to be published. In order to initiate publication of an event that includes such data or commands, publishing application 201 generates and transmits a publishing request. The publishing request is then sent to a publish/subscribe client 200 that corresponds to the publishing application. In FIG. 2, publish/subscribe client $200_1$ corresponds to publishing application 201.

In one or more embodiments, publish/subscribe client $200_1$ is a software module that executes one or more functions that implement authentication, authorization, and privacy for the event publication. With respect to authentication, publish/subscribe client $200_1$ performs an authentication step for the publishing application (e.g., publication application 201). Thus, in the example depicted in FIG. 2, publish/subscribe client $200_1$ receives from publishing application 201 (along with the publication request), one or more credentials corresponding to publishing application 201. For example, publishing application 201, when publishing events of a certain type, transmits a specific user identification (userID) and password. Upon receiving the userID and password, publish/subscribe client $200_1$ calls an authentication service, such as authentication service 210 in FIG. 2.

Authentication service 210 may be any system that performs user authentication (such as, for example, the authentication mechanism implemented on Linux®-based systems). Authentication service 210 receives the aforementioned credentials from publish/subscribe client $200_1$ and performs authentication to verify that publishing application 201 is authorized to access publish/subscribe system 100. In the embodiment depicted, authentication service 210 receives a userID and password from publish/subscribe client $200_1$. Authentication service 210 then verifies that the userID and password provided are present in user table 211. Assuming that the userID and password are located in user table 211, authentication service 210 transmits a response to publish/subscribe client $200_1$ that indicates that publishing application 201 is authorized to use publish/subscribe system 100. It should be noted that user table 211, as well as other components under the control of authentication service 210, are typically managed by a system administrator.

After performing authentication for publishing application 201, publish/subscribe client $200_1$ then executes functions to implement privacy for the event publication. In order to achieve privacy, embodiments of publish/subscribe client $200_1$ interact with a key management server, such as key service 220 depicted in FIG. 2.

Key service 220 is a software module that is responsible for maintaining access control for specific event types. That is, key service 220 associates a userID with one or more event types. This means that a given userID is authorized to publish and subscribe to events that are of the associated event type. Thus, referring to FIG. 1, VM remote administrator 102 may be authorized to publish and subscribe to an event identified as "VM management," while user application 101 may not be so authorized. The association of userIDs with event types is depicted in FIG. 2 as records in access control table 221. It should be noted that a publisher or subscriber may be authorized for a given event type on a permanent basis or on a temporary basis. Thus, each of the records in access control table 221 also includes a "time to live" field, which specifies a time at which the access control is set to expire. In embodiments, if this time to live field is set to a null value, then the authorization for a particular userID to publish or subscribe to a given event type is permanent.

Further, access control table 221 is managed, in embodiments, by a system administrator (or other authorized user). Such an administrator creates, deletes, and modifies access control records in access control table 221. If an access control record is created with a time to live that is not null, then, at the expiration of the time to live, the access control is automatically deleted. The administrator may also "renew" an access control record by resetting the time to live value. It should be noted that access control records in access control table 221 which are created and managed by an administrator are referred to as "persistent" records (or persistent "registrations"). Administrators typically set up persistent registrations for events that are published and subscribed to on an ongoing basis. For example, a publisher may distribute a confidential newsletter to a number of subscribers once daily. In this case, the publisher may not know who the subscribers are. Thus, an administrator creates and deletes records from access control table 221 to specify who can publish the confidential newsletter, as well as who can subscribe to the newsletter.

In FIG. 2, when publishing application transmits a publication request to publish/subscribe client $200_1$, publish/subscribe client $200_1$ transmits the userID and event type to key service 220. Key service 220 then performs a lookup to access control table 221 in order to locate a record that associates the userID with the event type If such a record is found, then publish/subscribe client $200_1$ (and publishing application 201) is authorized to publish events of that type. On the other hand, if no such record is found, then publishing application 201 is not authorized to publish events of that type.

The secure publish/subscribe system depicted in FIG. 2 also supports "transient" registrations. In a transient registration, an administrator does not configure the access controls for the particular event type. Rather, publishing application 201 and publish/subscribe client $200_1$ provide the information needed to authorize publishing and subscribing to an event. In this instance, publish/subscribe client $200_1$ transmits to key service, along with an event type, one or more userIDs that are to be authorized to subscribe to events having the transmitted event type. In one or more embodiments, publish/subscribe client $200_1$ specifies (in the request) that the publication corresponds to a transient registration. Key service 220 then dynamically creates corresponding records in access control table 221. It should be noted that such records may, in embodiments, be identified specifically as transient registrations. In other embodiments, such records may be created with time to live entries that expire within some short period of time. In addition, transient registrations may be accessed and managed by an administrator. For example, and administrator may delete a transient registration, or the administrator may convert the transient registration to a persistent registration.

As shown in FIG. 2, key service 220 also manages key table 222. Key table 222 is a data store that associates event types with one or more symmetric keys. Referring to FIG. 2, once publishing application 201 is authenticated and is deemed authorized to publish events of the event type included in the publish request, key service 220 returns to publish/subscribe client $200_1$ a key that corresponds to the event type. Publish/subscribe client $200_1$ then encrypts the data that has been requested to be published by publishing application 201.

As shown in FIG. 2, each record in key table 222 associates an event type with a current key and a previous key. According to one or more embodiments, key service 220 periodically generates a new key for each registered event type. Prior to key generation, if a key already exists for the event type, key service 220 stores this key as a "previous" key, and stores the newly generated key as a current key. In one embodiment, this is performed by storing the current and previous keys in predetermined fields within each record of key table 222. In another embodiment, key service 220 associates a version number with each key. Thus, in such a case, the current key would be version 0, while the previous key would be version 1. Further, if, at the time of key generation, a previous key for the event type already exists, that previous key is deleted and replaced by the "current" key already in place. It should be noted that both keys are returned by key service 220 to publish/subscribe client $200_1$.

After the returned key is used to encrypt the data corresponding to the published event, publish/subscribe client $200_1$ publishes the event by transmitting data to publish/subscribe system 100. In one or more embodiments, the transmitted data includes header information, which provides identifying information for the publication, as well as a data field (referred to as the "body" of the published event). The body is a byte array, which, in the embodiments described herein, contains encrypted data, the data having been encrypted by publish/subscribe client $200_1$ using the key returned by key service 220. An illustration of the structure of a published event is described below with reference to FIG. 3.

Referring back to FIG. 2, subscribing application 212 subscribes to various types of events and, when a particular event of a subscribed type is published, subscribing application 212 is notified of the publication. Much like publishing application 201, subscribing application 212 communicates with a publish/subscribe client (shown as publish/subscribe client $200_2$). Publish/subscribe client $200_2$ performs similar functions as publish/subscribe client $200_1$.

In one or more embodiments, publish/subscribe client $200_2$ listens for publications that occur on publish/subscribe system 100 and determines whether a given publication is intended for a subscribing application. For instance, when an event that subscribing application 212 subscribes to is published, publish/subscribe system 100 transmits the event to that subscriber. Specifically, publish/subscribe system 100 routes the event to publish/subscribe client $200_2$. Before notifying and transmitting the event to subscribing application 212, publish/subscribe client first performs an authentication of subscribing application 212. That is, as was the case for publish/subscribe client $200_1$, publish/subscribe client $200_2$ provides credentials corresponding to subscribing application 212 to authentication service 210. Authentication service 210 proceeds in similar fashion as previously described.

Once subscribing application 212 is authenticated, publish/subscribe client $200_2$ calls key service 220 to ensure that subscribing application 212 is authorized to received events of the type that are published. That is, although publish/subscribe system 100 stores information that indicates that subscribing application 212 is a subscriber to one or more events, key service 220 maintains (in access control table 221) an additional layer of security for securely published events. For example, referring to FIG. 1, if VM remote administrator 102 publishes a secure event with event type "VM management," then, in order for subscribing application 212 to receive the secure event, an association between the userID for subscribing application 212 and the event type "VM management" needs to be present in access control table 221.

Once it is determined that subscribing application 212 is authorized to receive events according to the event type of the published event, publish/subscribe client $200_2$ then calls key service 220 in order to retrieve the symmetric key required to decrypt the body of the published event. As previously mentioned, publish/subscribe client $200_1$ encrypts the body of a published event using a key obtained for the event type corresponding to the event, the key being obtained from key table 222. Since the key is a symmetric key, the body of the event needs to be decrypted using the same key. Hence, publish/subscribe client $200_2$ issues a request to key service 220 to obtain the correct key. Publish/subscribe client $200_2$ provides the event type and the key version (which are each stored in the header of the published event) to key service 220. Key service 220 then returns the correct key to publish/subscribe client $200_2$. Publish/subscribe client $200_2$ then decrypts the body of the event using the returned key.

Further, as mentioned previously, key service 220 maintains two keys (i.e., a current key and a previous key) for each event type. Thus, if there is a large latency present in publish/subscribe system 100 (due to, for example, high network traffic), it is unlikely that the key used to encrypt the event body will no longer be the current key. That is, when latency is high, the key used by publish/subscribe client $200_1$ to encrypt the event body (which, at the time of encryption, was the current key) is still available at the time of decryption, where the previously used current key is the previous key at the time of decryption. According to one or more embodiments, publish/subscribe client $200_2$ receives the current and previous keys from key service 220 when requesting the decryption key. Key service 220 receives both the current and previous keys for that event type, so it can decrypt current and older secure events during the transition window of reissuing a new current key.

Figure 3:
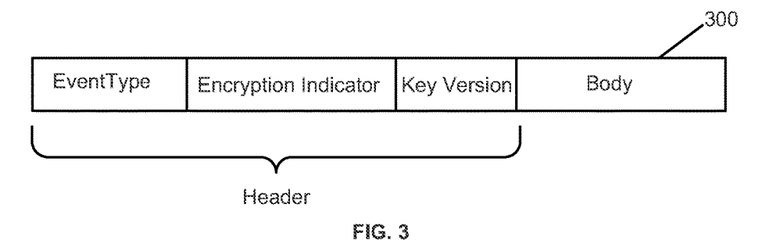
FIG. 3 is a conceptual diagram that depicts the structure of a published event 300, according to one or more embodiments.

FIG. 3 is a conceptual diagram that depicts the structure of a published event 300, according to one or more embodiments. Published event 300 is logically divided into sections. One section, a header, is divided into subsections. The header is unencrypted; that is, any recipient may read the header without first decrypting it with a key. The header field includes a field that specifies the event type, which is used by publish/subscribe system 100 to route events to subscribers that are subscribed to events of that type. The header field also includes an encryption indicator. This field is set by the publish/subscribe client of a publishing application, such as publish/subscribe client $200_1$. The field indicates that the body of the published event is encrypted, thus informing the subscriber's publish/subscribe client (e.g., publish/subscribe client $200_2$) that a key needs to be retrieved from key service 220 in order to decrypt the body of the event.

Next, a key version is also included in the header. The key version (which can be a numerical value) indicates the version of the key that was used to encrypt the event body. Thus, when publish/subscribe client $200_2$ requests a decryption key from key service 220, the event type is included in the request. Key service 220 then locates the correct keys (i.e., current and previous) in the record in key table 222 that corresponds to the event type. Upon returning the keys to publish/subscribe client $200_2$, publish/subscribe client $200_2$ then decrypts the event body using the corresponding key (i.e., current or previous).

Finally, published event 300 also includes a body. As previously mentioned, the body is a byte array that contains data that is to be used by subscribers. When a secure publication is performed, the body is encrypted and decrypted with the symmetric key obtained from key service 220. When publication is not performed in a secure manner, the body is not encrypted. Thus, in this case, any subscriber, regardless of whether the subscriber is authenticated or authorized, may access the body and respond accordingly.

Figure 4:
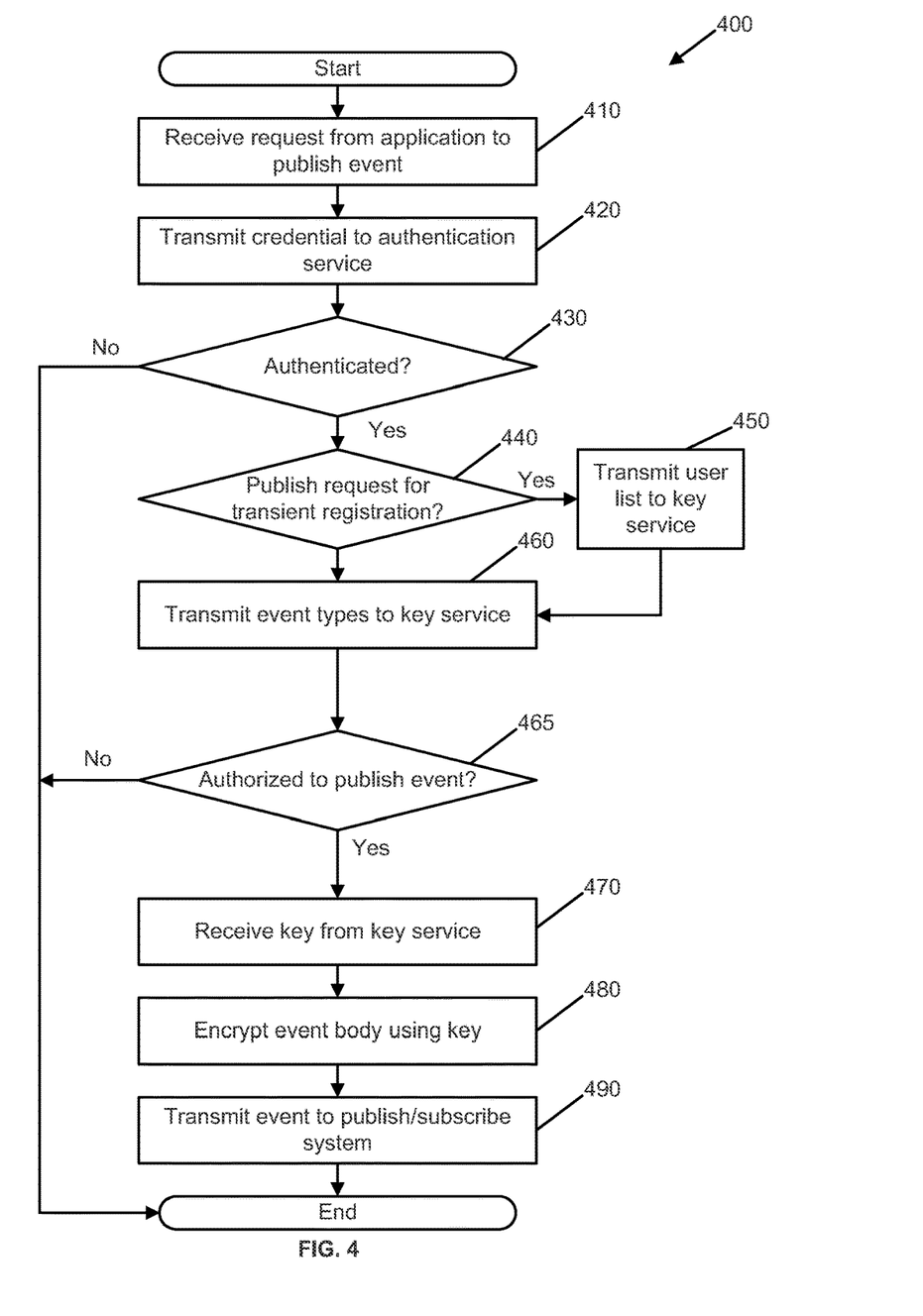
FIG. 4 is a flow diagram that depicts a method for securely publishing events to subscribers using a publish/subscribe system, according to embodiments.

FIG. 4 is a flow diagram that depicts a method 400 for securely publishing events to subscribers using a publish/subscribe system, according to embodiments. Method 400 is executed by a publish/subscribe client that corresponds to a publishing application, such as publish/subscribe client $200_1$ depicted in FIG. 2. Method 400 begins at step 410, where the publish/subscribe client receives a request from a publishing application to publish an event. The request includes, according to embodiments, credentials (such as a userID and password) for the publishing application, an event type that corresponds to the event to be published, along with data to be published. In addition, if the event that is to be published is a "transient" publication (i.e., a publication requiring a transient registration), then the request also includes one or more other user credentials (i.e., userIDs) that correspond to subscribers to the event.

Next, at step 420, the publish/subscribe client transmits credentials to an authentication service. The authentication service then performs authentication to verify the identity of the publishing application. At step 430, the publish/subscribe client determines whether the credentials were successfully authenticated. If the authentication service was not able to authenticate the credentials provided to it, then method 400 terminates. However, if the credentials were authenticated, then method 400 proceeds to step 440.

At step 440, the publish/subscribe client determines whether the publish request corresponds to a transient registration. As previously mentioned, transient registrations are temporary authorizations for a publisher to securely publish an event to one or more subscribers. If the publish request corresponds to a transient registration, then method 400 proceeds to step 450.

At step 450, the publish/subscribe client transmits a user list to a key service. As previously mentioned, the key service (such as key service 220 in FIG. 2), maintains access controls that are used to determine whether a given application is authorized to publish or subscribe to events of a certain type. Upon receiving the user list from the publish/subscribe client, the key service temporarily authorizes the publisher and subscribers (i.e., the users included in the list) to publish and subscribe to events of the event type included with the publish request. According to one or more embodiments, this is accomplished by the key service creating records in an access control table, such as access control table 221 depicted in FIG. 2. After step 450, method 400 proceeds to step 460.

At step 460, the publish/subscribe client transmits the event type that corresponds to the publish request to the key service. Once the key service receives the userID of the publishing application and the event type, the key service then determines whether the publisher is authorized to publish events of the event type. In one or more embodiments, the key service determines whether the publisher is authorized by performing a lookup in the access control table. It should be noted that, for transient registrations, the publisher will be deemed authorized because records for such registrations are created dynamically in response to the publication request.

If the publish/subscribe client receives notification, at step 465, that the key service has determined that the publisher is not authorized to publish events of the type included in the publish request, then method 400 terminates. Otherwise, method 400 proceeds to step 470. At step 470, the publish/subscribe client receives a key from the key service. As described with respect to FIG. 2, this key is a symmetric key, where the key service maintains two versions of a key for each event type. In embodiments, the key service transmits the current (or latest) version of the key to the publish/subscribe client.

Next, at step 480, the publish/subscribe client encrypts the body of the event publication using the key received at step 470. After encrypting the event body, the publish/subscribe client transmits the event to the publish/subscribe system. The publish/subscribe system then propagates the event to subscribers that have subscriptions to events of that type. At step 490, the publish/subscribe client constructs the header of the published event, which includes, as was previously mentioned, an event type, and indicator as to whether the event is encrypted, and a key version identifier. This header information is used by the publish/subscribe system to route the published event to the correct subscribers. Further, it is used by a publish/subscribe client for a subscribing application in order to decrypt the encrypted event body.

After step 490, method 400 terminates.

Figure 5:
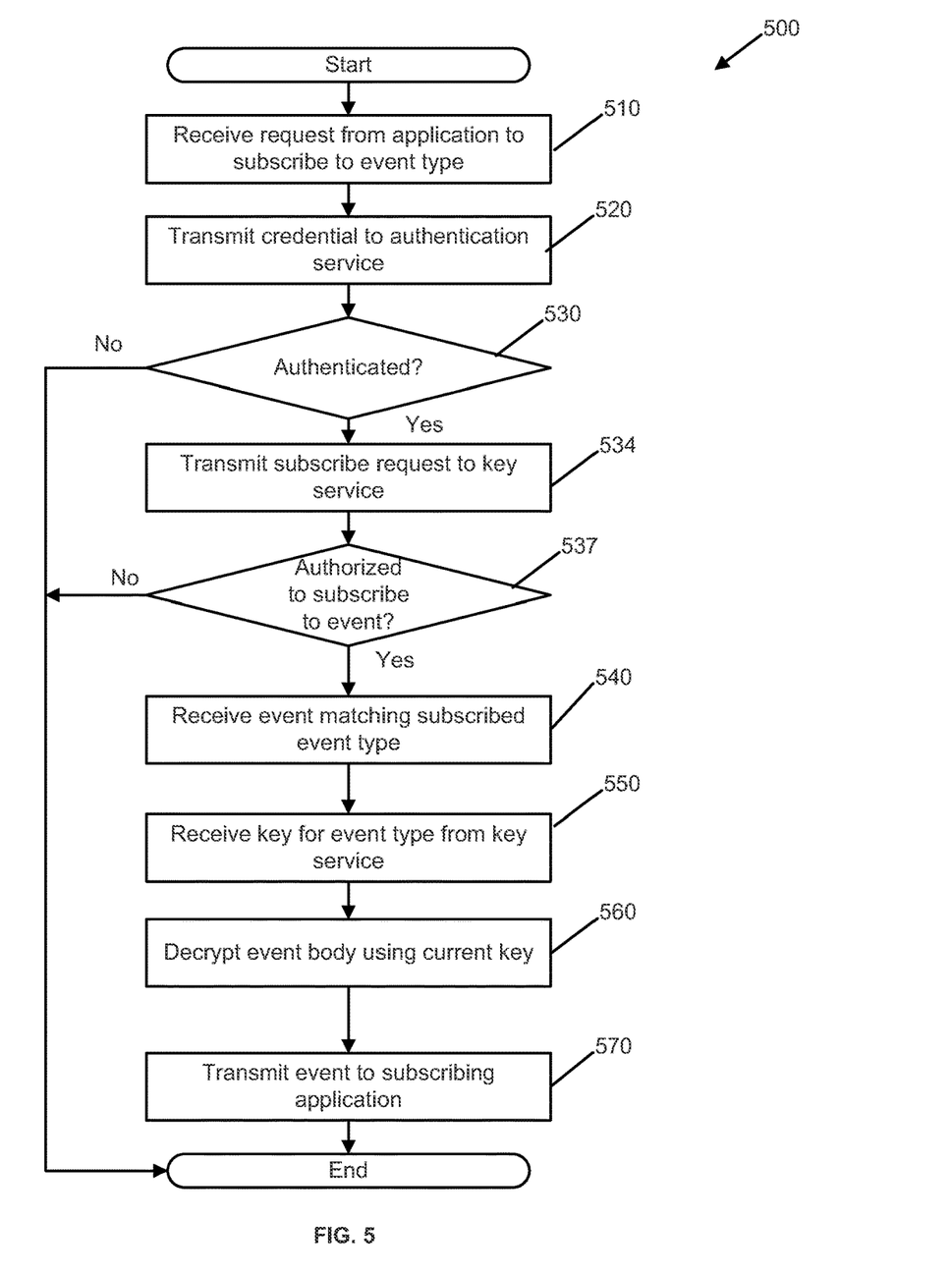
FIG. 5 is a flow diagram that depicts a method of securely receiving, by a subscribing application, an encrypted event, according to one or more embodiments.

FIG. 5 is a flow diagram that depicts a method 500 of securely receiving, by a subscribing application, an encrypted event, according to one or more embodiments. Method 500 is executed by a publish/subscribe client that corresponds to a subscribing application. An example of such a client is publish/subscribe client 200₂, depicted in FIG. 2.

Method 500 begins at step 510, where the publish/subscribe client receives a request from a subscribing application to subscribe to events that are of a particular event type. Upon receiving the subscription request, the publish/subscribe client, at step 520, transmits credentials for the subscribing application to an authentication service. As was the case with respect to method 400 (corresponding to publishing), the authentication service performs authentication on the supplied credentials. If the publish/subscribe client determines, at step 530, that the credentials were not authenticated by the authentication service, then method 500 terminates. However, if the authentication service was able to authenticate the credentials, then method 500 proceeds to step 534.

At step 534, the publish/subscribe client transmits a subscribe request to a key service. The key service (such as, for example, key service 220 in FIG. 2) receives the subscribe request, which, according to embodiments, includes a userID for the subscribing application, as well as the event type to which the subscription request is directed. As described with respect to method 400 in FIG. 4, the key service determines whether the userID provided has been associated with the event type in an access control table. Proceeding to step 537, if the publish/subscribe client receives notification that the key service has determined that the subscribing application is not authorized to subscribe to events of the type in the subscription request, then method 500 terminates. However, if the key service has determined that the subscribing application is authorized to subscribe to events of the type in the subscription request, then method 500 proceeds to step 540.

At step 540, the publish/subscribe client receives an event which has an event type that matches the subscription request. The event comprises an unencrypted header section and an encrypted body. The header includes the event type, an indicator as to whether the body is encrypted, and a key version. The publish/subscribe client reads these fields, determines that the event body has been encrypted, and requests a key from the key service, specifying the event type.

At step 550, the publish/subscribe client receives from the key service the keys (i.e., current and previous) that correspond to the event type. It should be noted that the received key may be either the current key or the previous key, which depends on the latency present in the publish/subscribe system.

After receiving the key corresponding to the received event type, method 500 then proceeds to step 560. At step 560, the publish/subscribe client decrypts the received event body with the key received at step 550. After decrypting the event body, the publish/subscribe application transmits, at step 570, the decrypted event data to the subscribing application.

Figure 6:
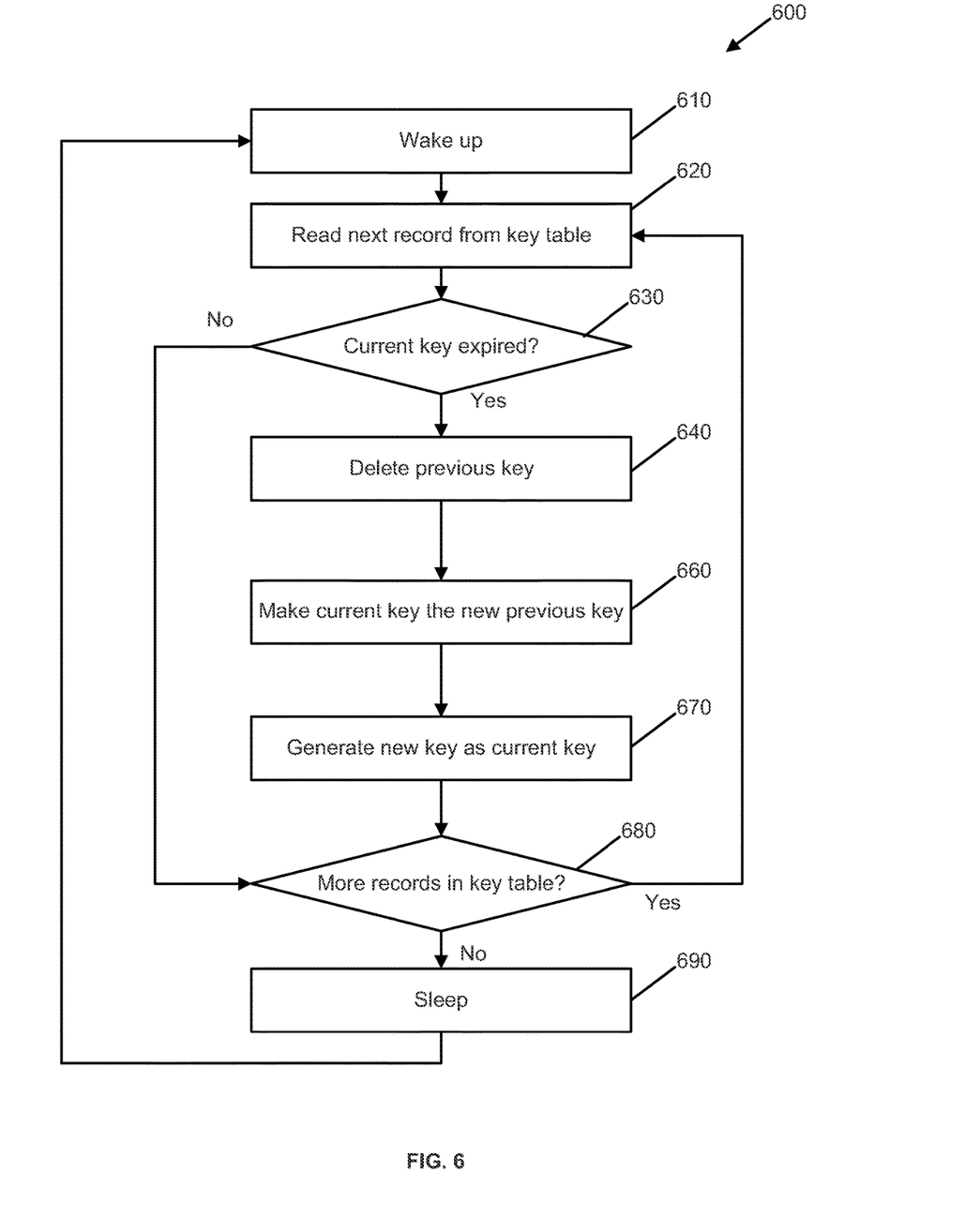
FIG. 6 is a flow diagram that depicts a method of managing keys by a key service, according to embodiments.

After step 570, method 500 terminates. It should be noted that all steps of method 500 are applicable for persistent registrations (i.e., for access controls that are maintained persistently in the access control table used by the key service). However, for transient registrations, method steps 510, 534, and 537 are not applicable. This is due to the fact that, for persistent registrations, the key service dynamically creates access control records for subscribing applications in response to the publication request from the publisher. Thus, for transient registrations, the subscriber does not issue a subscription request on its own behalf FIG. 6 is a flow diagram that depicts a method 600 of managing keys by a key service, according to embodiments. Method 600 is performed by, for example, key service 220, depicted in FIG. 2. As previously mentioned, for each event type, the key service maintains two keys: a current key and a previous key. Further, each key has an associated expiration time, after which the key can no longer be used. In order to manage the expiration and replacement of event keys, method 600 is executed as a continuous process that periodically "sleeps" and "wakes up" according to a predetermined schedule.

Method 600 begins at step 610, where the key service wakes up after having been dormant for a predetermined amount of time. Next, at step 620, the key service reads a next record from the key table, such as key table 222 depicted in FIG. 2. The key service reads expiration times for each key stored in the key table record (i.e., the current key and previous key shown in FIG. 2).

Next, at step 630, the key service determines whether the current key has expired, based on the current time and the expiration time associated with the key. If the current key has not expired, then method 600 proceeds to step 680. If however, the current key has expired, then method 600 proceeds to step 640.

At step 640, the key service deletes the previous key currently stored in the record. Next, at step 660, the key service makes the current key the "new" previous key. Conceptually, the key service effectively copies the current key from its existing location in the key table record to the location previously occupied by the previous key. Method 600 then proceeds to step 670.

At step 670, the key service generates a new key and stores this new key as the current key. Thus, for example, if, before steps 640 and 660, the current key is designated as version 2 and the previous key is designated as version 1, then, after steps 640 and 660, the version 1 of the key is deleted, version 2 is stored as the previous key, and a new key is generated as the current key, and having version 3.

After step 670, method 600 proceeds to step 680, where the key service determines whether there are more records (i.e., corresponding to more event types) in the key table. If there are no more records present in the key table, then method 600 proceeds to step 690, where the key service sleeps for a predetermined amount of time before waking again. However, if there are more records present in the key table, then method 600 proceeds back to step 620 to read a next record from the key table. Then, after step 620, method 600 proceeds to again execute steps 630-680.

Although one or more embodiments have been described herein in some detail for clarity of understanding, it should be recognized that certain changes and modifications may be made without departing from the spirit of the disclosure. For example, in an alternative embodiment, an additional layer of privacy is provided by the use of asymmetric keys. In such an embodiment, a publisher possesses both a public and a private key. Data that is encrypted with the public key may only be decrypted using the private key. Upon publishing an event to one or more subscribers, the body of the event includes event data, as well as the public key. As in the embodiments described herein, the body of the event is encrypted using the symmetric key obtained from the key manager. When the event is received by the subscriber, the body of the event is then decrypted using the same version of the symmetric key, which is obtained by the subscriber from the key manager. According to this embodiment, the subscriber encrypts a response to the event using the public key published by the publisher. The subscriber then assumes the role of publisher and publishes the response according to an event type that the original publisher has subscribed to. When the original publisher receives the response event, the body of the response event is then decrypted using the private asymmetric key. In this way, the response (which may comprise sensitive data) may only be decrypted using the private key in possession of the original publisher, rather than using a symmetric key obtained from the key manager.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. In a distributed event system that includes a plurality of publishers, a communication infrastructure, and a key manager that manages access to publishing of events by one or more applications, a method of publishing an event for consumption by a first subscriber to the event, the method comprising:
   determining an occurrence of the event, wherein the event is a message that is classified as a first event type, and wherein determining the occurrence of the event includes receiving from an application a request to publish the event, the request including credentials, an identifier of the first event type, and event data;
   responsive to the determining, obtaining, from the key manager, an encryption key for the first event type;
   encrypting the event using the encryption key to produce an encrypted event;
   adding to the encrypted event an unencrypted header which includes an identifier of the first event type; and
   transmitting the encrypted event with the unencrypted header for decryption and consumption by the first subscriber,
   wherein the encrypted event with the unencrypted header is routed to one or more subscribers of the first event type, including the first subscriber, which are identified based on at least the identifier of the first event type included in the unencrypted header, and
   wherein the first subscriber obtains a decryption key for decrypting the encrypted event from the key manager in response to providing at least the identifier of the first event type included in the unencrypted header to the key manager.

2. The method of claim 1, wherein the request further includes an identifier of the first subscriber.

3. The method of claim 2, further comprising authorizing, by the key manager, the first subscriber to receive events of the first event type.

4. The method of claim 1, further comprising:
   transmitting the credentials to an authentication service; and
   authenticating, by the authentication service, the application based on at least the credentials.

5. The method of claim 4, further comprising:
   transmitting the credentials and the identifier of the first event type to the key manager; and
   determining, by the key manager, whether the application is authorized to publish the event based on at least the credentials and the identifier of the first event type,
   wherein the key manager provides the encryption key used to encrypt the event in response to determining that the application is authorized to publish the event.

6. The method of claim 5, wherein:
   the key manager maintains a plurality of keys that correspond to the first event type, each of the plurality of keys being associated with a respective version identifier and being generated by the key manager at a respective time;
   the event is encrypted with an encryption key associated with a first version identifier;
   the unencrypted header further includes the first version identifier; and
   the first subscriber obtains the decryption key for decrypting the encrypted event from the key manager in response to providing the identifier of the first event type and the first version identifier included in the unencrypted header to the key manager.

7. In a distributed event system that includes a plurality of subscribers, a communication infrastructure, and a key manager that manages access to subscribing to events by one or more applications, a method comprising:
   determining that an event has been published, wherein the event is a message that is classified as a first event type, wherein the event is published responsive to a request to publish the event, the request including credentials, an identifier of the first event type, and event data, wherein the published event includes an encrypted body and an unencrypted header which includes an identifier of the first event type, and wherein the published event is routed to one or more subscribers of the first event type which are identified based on at least the identifier of the first event type included in the unencrypted header;
   obtaining, from the key manager, a decryption key for the first event type in response to providing at least the identifier of the first event type included in the unencrypted header to the key manager;
   decrypting the published event with the obtained decryption key to produce an unencrypted event; and
   consuming the unencrypted event.

8. The method of claim 7, wherein the determining that the event has been published comprises:
   listening to the communication infrastructure for event publications;
   detecting an event publication; and
   determining that the detected event publication corresponds to an event type identified in a subscription request.

9. The method of claim 8, further comprising receiving the subscription request from an application, the subscription request including an identifier for the application and the event type identified in the subscription request.

10. The method of claim 9, further comprising:
    authenticating, by an authentication service, the application based on credentials provided by the application.

11. The method of claim 10, wherein the event type included in the subscription request matches the first event type that the event is classified as.

12. The method of claim 11, further comprising:
    transmitting the credentials provided by the application and the identifier of the first event type to the key manager; and
    determining, by the key manager, that the application is authorized to receive the published event based on the credentials provided by the application and the identifier of the first event type.

13. The method of claim 12, wherein the key manager maintains a plurality of keys that correspond to the first event type, each of the plurality of keys being associated with a respective version identifier and being generated by the key manager at a respective time.

14. The method of claim 13, wherein:
    the unencrypted header further includes a version identifier of an encryption key used to encrypt the published event; and
    a version identifier of the obtained decryption key matches the version identifier of the encryption key used to encrypt the published event.

15. A computer-based system comprising:
    a processor;
    memory; and
    a communication infrastructure, the system programmed with a first set of instructions for the system to perform the steps of a publisher, and a second set of instructions for the system to perform the steps of a first subscriber, wherein, when the first and second set of instructions are executed, the system performs a method comprising:

determining an occurrence of an event, wherein the event is a message that is classified as a first event type, and wherein determining the occurrence of the event includes receiving from an application a request to publish the event, the request including credentials, an identifier of the first event type, and event data, responsive to the determining, obtaining, from a key manager, an encryption key for the first event type, encrypting the event using the encryption key to produce an encrypted event, adding to the encrypted event an unencrypted header which includes an identifier of the first event type, and transmitting the encrypted event with the unencrypted header for decryption and consumption by the first subscriber, wherein the encrypted event with the unencrypted header is routed to one or more subscribers of the first event type, including the first subscriber, which are identified based on at least the identifier of the first event type included in the unencrypted header, and wherein the first subscriber obtains a decryption key for decrypting the encrypted event from the key manager in response to providing at least the identifier of the first event type included in the unencrypted header to the key manager.

16. The system of claim 15, wherein the method further comprises generating, by the first subscriber, a subscription request, the subscription request including an identifier of the first event type.

17. The system of claim 16, wherein:

the key management server is configured to maintain a plurality of keys that correspond to the first event type, each of the plurality of keys being associated with a respective version identifier and being generated by the key manager at a respective time;

the event is encrypted with an encryption key associated with a first version identifier; and the event is decrypted with a decryption key associated with a second version identifier that matches the first version identifier.

* * * * *